United States Patent
Jin et al.

(10) Patent No.: US 9,846,080 B2
(45) Date of Patent: Dec. 19, 2017

(54) REAL TIME BIREFRINGENT IMAGING SPECTROMETER BASED ON DIFFERENTIAL STRUCTURE

(71) Applicant: Harbin Institute of Technology, Harbin, Heilongjiang (CN)

(72) Inventors: Peng Jin, Heilongjiang (CN); Shuaishuai Zhu, Heilongjiang (CN); Yu Zhang, Heilongjiang (CN); Jie Lin, Heilongjiang (CN)

(73) Assignee: HARBIN INSTITUTE OF TECHNOLOGY, Nangang District, Harbin, Heilongjiang (CN)

( * ) Notice: Subject to any disclaimer, the term of this patent is extended or adjusted under 35 U.S.C. 154(b) by 0 days.

(21) Appl. No.: 15/119,489

(22) PCT Filed: Feb. 11, 2015

(86) PCT No.: PCT/CN2015/072755
§ 371 (c)(1),
(2) Date: Aug. 17, 2016

(87) PCT Pub. No.: WO2015/124076
PCT Pub. Date: Aug. 27, 2015

(65) Prior Publication Data
US 2017/0010159 A1 Jan. 12, 2017

(30) Foreign Application Priority Data
Feb. 18, 2014 (CN) .......................... 2014 1 0053302

(51) Int. Cl.
*G01J 3/45* (2006.01)
*G01J 3/453* (2006.01)
(Continued)

(52) U.S. Cl.
CPC ............. *G01J 3/453* (2013.01); *G01J 3/0208* (2013.01); *G01J 3/2823* (2013.01); *G01J 3/447* (2013.01)

(58) Field of Classification Search
CPC ...... G01J 3/00; G01J 3/45; G01J 3/453; G01J 3/2823
See application file for complete search history.

(56) References Cited

U.S. PATENT DOCUMENTS

| 2005/0174573 A1* | 8/2005 | Harvey | ................. G01J 3/2823 356/328 |
| 2012/0268745 A1 | 10/2012 | Kudenov | |
| 2014/0198315 A1* | 7/2014 | Priore | ....................... G01J 3/32 356/364 |

FOREIGN PATENT DOCUMENTS

| CN | 101793558 A | 8/2010 |
| CN | 101819065 A | 9/2010 |

(Continued)

*Primary Examiner* — Jonathan Hansen
(74) *Attorney, Agent, or Firm* — Global IP Services; Tianhua Gu

(57) ABSTRACT

A real-time birefringent imaging spectrometer based on differential structure is provided. A polarization beam splitter to add an imaging branch is set. Meanwhile, the structure alters the conventional optical structure to the differential structure by setting another polarization beam splitter. Taking the difference between these two interferogram obtained by two branches of differential structure as the final interferogram and performing the required post-processing calculations produces the spectrum at each pixel. Common-mode error is intensively restrained due to the differential structure, and 50% of the optical loss is avoided because of casting off the analyzer; a high spatial resolution, high spectral resolution image is acquired by combining the high spatial resolution, colorful image with the low spatial resolution, high spectral resolution image.

4 Claims, 4 Drawing Sheets

Figure 1:
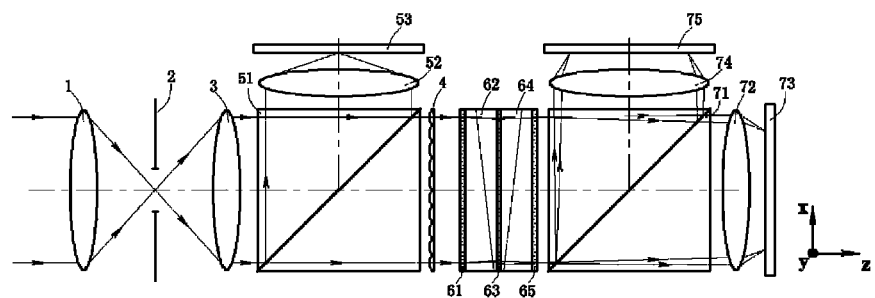

(51) Int. Cl.
 G01J 3/447 (2006.01)
 G01J 3/28 (2006.01)
 G01J 3/02 (2006.01)

(56) References Cited

FOREIGN PATENT DOCUMENTS

| | | |
|---|---|---|
| CN | 103119407 A | 5/2013 |
| CN | 103528688 A | 1/2014 |
| CN | 103822714 A | 5/2014 |
| CN | 103822715 A | 5/2014 |
| EP | 1598647 A1 | 11/2005 |

* cited by examiner

US 9,846,080 B2

REAL TIME BIREFRINGENT IMAGING SPECTROMETER BASED ON DIFFERENTIAL STRUCTURE

CROSS REFERENCE TO RELATED PATENT APPLICATION

The present application is the US national stage of PCT/CN2015/072755 filed on Feb. 11, 2015, which claims the priority of the Chinese patent application No. 201410053302.5 filed on Feb. 18, 2014, which applications are incorporated herein by reference.

TECHNICAL FIELD OF THE INVENTION

This invention relates to a real-time birefringent imaging spectrometer based on differential structure, which can be used for acquiring the objective image and the spectrum on every pixel of the image in a single integral time of CCD.

DESCRIPTION OF PRIOR ART

Spectrometer is wildly used in agriculture, astronomy, biomedical sciences, chromaticity measurement and many other fields. Spectrometer can be divided into two categories according to different principles: one is dispersive spectrometer based on dispersive prism or grating, which can acquire the objective spectrum directly; the other one is interferometer spectrometer based on Michelson interferometer or other kind of interferometer, which can obtain a interferogram, and the objective spectrum can be acquired by performing the Fourier transformation of the interferogram.

Dispersive spectrometer as a mature technology has stable performance, but the structure is relatively complex. Meanwhile high spatial resolution and high spectral resolution require a small entrance slit, which limits the throughput and signal-to-noise ratio. Interferometer spectrometer using the Fourier transform of two-beam interference interferogram to obtain spectral data has large throughput, high spectral resolution, and wide free spectral range. Early interferometer spectrometer mostly based on Michelson interferometer whose throughput is about 190 times the grating spectrometer at the same spectral resolution. But these instruments require stable and precision scanning mirrors, therefore they cannot obtain the objective spectral information in real-time, and their use in hostile environments requires significant sophistication in construction.

With the development of spectroscopy, a snapshot spectrometer to obtain real-time images and spectral information is needed in bioinstrumentation, environmental monitoring, military reconnaissance and other fields. For this purpose, a lot of researches have been done by scholars. In the 90s of last century, Akiko Hirai et al published a paper named "Application of Multiple-Image Fourier Transform Spectral Imaging to Measurement of Fast Phenomena, OPTICAL REVIEW Vol. 1, No. 2 (1994) 205-207", in which they proposed a snapshot imaging spectrometer based on lens array for the first time. This instrument can capture the image and spectral information of an object rotating at a rate of approximately 30 revolutions per minute. But the instrument is relatively large, and sensitive to vibration and the misalignment of each mirror. Since then, Michael W. Kudenov et al from the University of Arizona published a paper named "Compact real-time birefringent imaging spectrometer, OPTICS EXPRESS 17973/Vol. 20, No. 16/30 Jul. 2012" which presents a compact snapshot imaging spectrometer based on lenslet array and Nomarski prisms. This instrument which is vibration insensitive and ultra-compact can capture images and spectral information of moving objects rapidly.

The imaging spectrometer presented by Michael W. Kudenov et al includes a object lens, a field stop, a collimator lens, a lenslet array, a generator, two Nomarski prisms, a half-wave plate, an analyzer, a CCD. The objective light transmits through the object lens, and the image forms on the field stop. After collimated by collimating lens, the light hits the lenslet array. Then the light transmits through the generator, the first Nomarski prism, the half-wave plate, the second Nomarski prism and the analyzer successively. After that the transmitted light is resolved into two equal amplitude, orthogonally polarized components that converge on the CCD.

M×N sub-images which can be arranged in a specific order are captured by the CCD. Consequently, each sub-image samples a different "slice" of the 3D interferogram data cube. Thus, an interferogram and its corresponding spectrum can be calculated at each spatial location within the objective image in a single integral time of CCD.

But because of capturing M×N sub-images simultaneously, this instrument has a low spatial resolution. In addition, the optical efficiency of the instrument is about 25% due to the generator and analyzer. This issue could be a serious problem when the objective light is weak and a high signal-to-noise ratio is demanded.

SUMMARY OF INVENTION

To solve the above problems, this invention presents a real-time birefringent imaging spectrometer based on differential structure. Comparing with the prior art, this invention can not only capture the image and spectral information of a moving object, but also greatly improve the spatial resolution and signal-to-noise ratio which is significant in accurate measurement field.

In order to attain the purpose mentioned above, the measuring equipment of this invention includes:

A object lens, a field stop, a collimator lens, two polarizing beam splitters, three eye lenses, a lenslet array, two Nomarski prisms, three half-wave plates, three CCDs.

The objective light transmits through the object lens, and the image forms on the field stop. After collimated by the collimating lens, the light reaches the first polarizing beam splitter and is split into two orthogonally polarized components: reflected light and transmitted light. The reflected light is imaged by the first eye lens onto the first CCD. The transmitted light hits the lenslet array along the original direction. Then the transmitted light transmits through the birefringent polarization interferometer which comprises: the first half-wave plate, the first Nomarski prism, the second half-wave plate, the second Nomarski prism and the third half-wave plate. After that the transmitted light is resolved into two equal amplitude, orthogonally polarized components by the third polarizing beam splitter. Finally these two components are imaged by the second eye lens and the third eye lens onto the second CCD and the third CCD respectively.

A 3D interferogram cube can be obtained by taking the difference between the images obtained by the second CCD and the third CCD. Performing the required post-processing calculations produces the spectrum at each spatial location within the objective image.

Comparing with the prior art, this invention has several improvements: first, we set the first polarization beam splitter between the collimator lens and the lenslet array, adding an imaging branch; secondly, we alter the conventional optical structure to the differential structure by setting the second polarization beam splitter.

The present invention has the following advantages:
(1) The spatial resolution is greatly improved. The imaging branch can obtain a high spatial resolution, colorful image, which can be combined with the low spatial resolution, high spectral resolution image obtained by the spectral branch. Thus, we can get the high spatial resolution, high spectral resolution image by an appropriate interpolation.
(2) The optical efficiency and the signal-to-noise ratio are greatly improved. The differential structure can intensively restrain the common-mode error, and reduce 50% of the optical loss because of casting off the analyzer.

BRIEF DESCRIPTION OF ACCOMPANYING DRAWINGS

Figure 2:
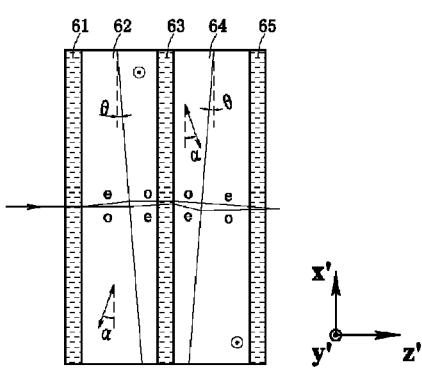
Figure 3:
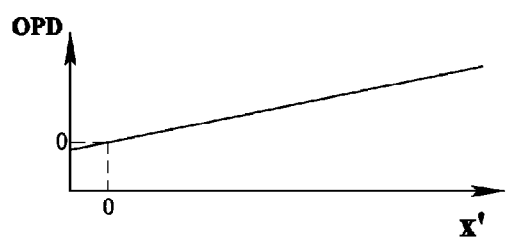
Figure 4:
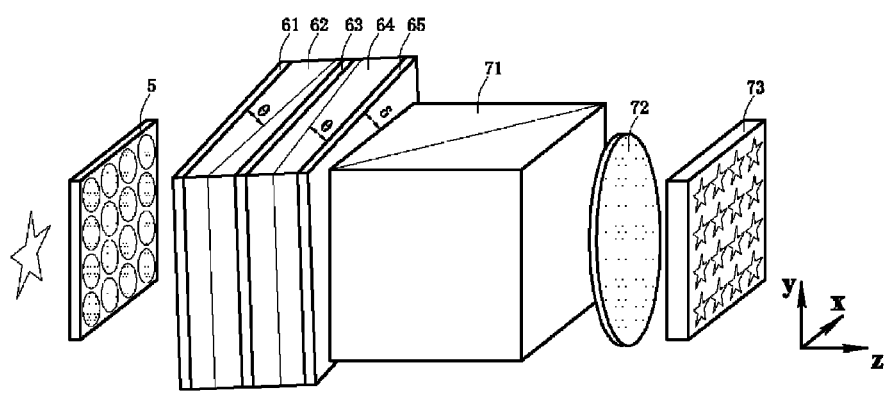
Figure 5:
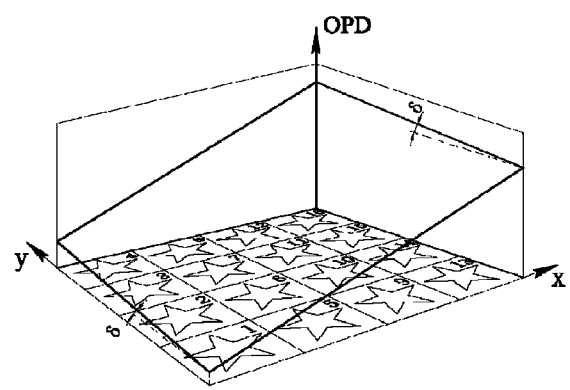
Figure 6:
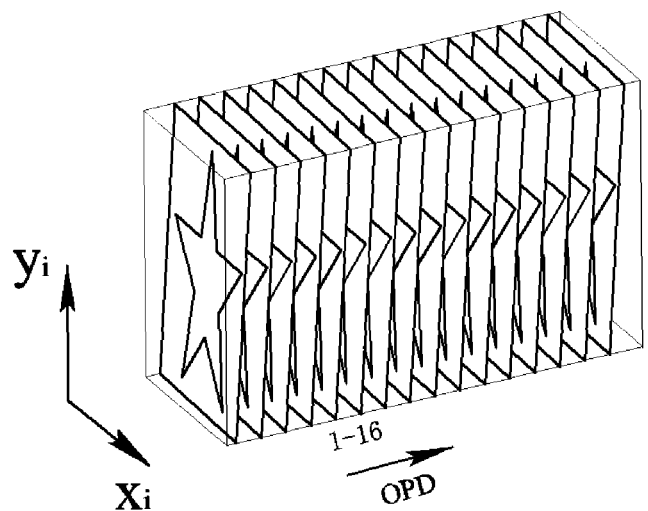
Figure 7:
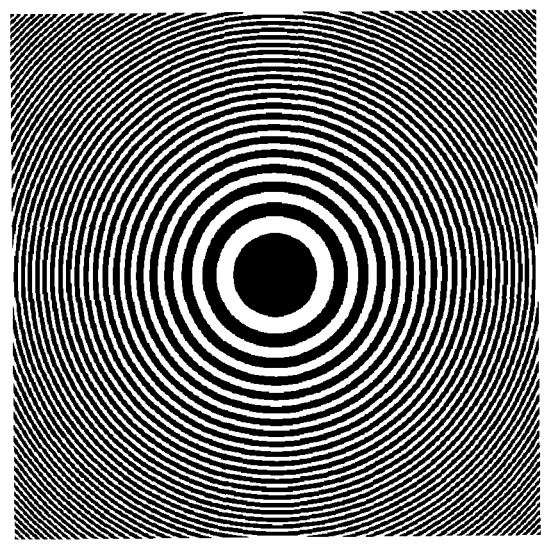
Figure 8:
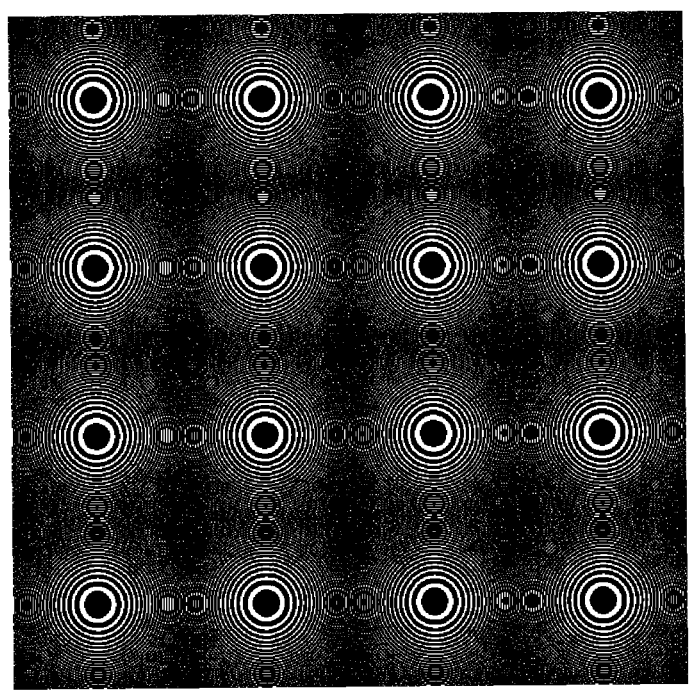

FIG. 1 is schematic illustration of the real-time birefringent imaging spectrometer based on differential structure.
FIG. 2 is schematic illustration of the birefringent polarization interferometer.
FIG. 3 is the distribution curve of the optical path difference.
FIG. 4 is isometric diagram of lenslet array and the spectral branch.
FIG. 5 is schematic illustration describing the distribution of the optical path difference.
FIG. 6 is schematic illustration of the 3D interferogram cube obtained by the transmitted spectral branch.
FIG. 7 is schematic illustration of a single Fresnel zone plate.
FIG. 8 is schematic illustration of a 4×4 Fresnel zone plate array.
Specification of piece numbers in the Figures: 1 object lens, 2 field stop, 3 collimator lens, 4 lenslet array, 51 the first polarizing beam splitter, 52 the eye lens of the imaging branch, 53 the CCD of imaging branch, 61 the first half-wave plate, 62 the first Nomarski prism, 63 the second half-wave plate, 64 the second Nomarski prism, 65 the third half-wave plate, 71 the second polarizing beam splitter, 72 the eye lens of transmitted spectral branch, 73 the CCD of transmitted spectral branch, 74 the eye lens of reflected spectral branch, 75 the CCD of reflected spectral branch.

DESCRIPTION OF PREFERRED EMBODIMENTS

Example 1

Preferred embodiments of the present invention will be described in detail with reference to the accompanying drawings.

As shown in FIG. 1, a real-time birefringent imaging spectrometer based on differential structure comprises: a object lens 1, a field stop 2, a collimator lens 3, a lenslet array 4, the first polarizing beam splitter 51, the eye lens of the imaging branch 52, the CCD of imaging branch 53, the first half-wave plate 61, the first Nomarski prism 62, the second half-wave plate 63, the second Nomarski prism 64, the third half-wave plate 65, the second polarizing beam splitter 71, the eye lens of transmitted spectral branch 72, the CCD of transmitted spectral branch 73, the eye lens of reflected spectral branch 74, the CCD of reflected spectral branch 75.

The objective light transmits through the object lens 1, and the image forms on the field stop 2. After collimated by collimating lens 3, the light reaches the first polarizing beam splitter 51 and is split into two orthogonally polarized components: reflected light and transmitted light. The reflected light is denoted as the imaging light, and the transmitted light is denoted as the spectral light. The imaging light is imaged by the eye lens of the imaging branch 52 onto the CCD of imaging branch 53. Thus, we acquire a high spatial resolution, colorful image.

After transmitting through the first polarizing beam splitter 51 the spectral light hits the lenslet array 4 along the original direction. Then the spectral light reaches the birefringent polarization interferometer which comprises: the first half-wave plate 61, the first Nomarski prism 62, the second half-wave plate 63, the second Nomarski prism 64 and the third half-wave plate 65 as shown in FIG. 2. The first half-wave plate 61 whose fast axis is tilted with respect to the x-axis by an angle of 22.5° is provided to orient the polarization orientation of the spectral light at 45 degrees with respect to the x-axis. The first Nomarski prism 62 and the second Nomarski prism 64 consist of two birefringent crystal prisms with wedge angle $\theta_1$ and $\theta_2$ respectively. Note that one of the fast axes in each Nomarski prism is tilted with respect to the x-axis by an angle α. This enables a real fringe localization plane to be formed outside of the prism. The second half-wave plate 63 is placed between the first Nomarski prism 62 and the second Nomarski prism 64. Orienting the fast axis of the second half-wave plate 63 can rotate the polarization eigenmodes of the second Nomarski prism 64 by 90°. Since then the localization plane is compensated to lie within the xy plane. As we know that the spectral light can be resolved into two equal amplitude, orthogonally polarized components by the Nomarski prism. The polarization orientations of these two components are along the x-axis and the y-axis respectively. The third half-wave plate 65 orienting at 22.5° with respect to the x-axis is provided to orient the polarization orientations of the components at 45° and 135° with respect to the y-axis respectively.

The second polarizing beam splitter 71 setting behind the birefringent polarization interferometer is provided to split the spectral light into two components imaged by the eye lens of transmitted spectral branch 72 and the eye lens of reflected spectral branch 74 onto the CCD of transmitted spectral branch 73 and the CCD of reflected spectral branch 75 respectively.

Assume that the spectral light is monochromatic and its wavenumber is σ. The optical path difference between the components of the spectral light after transmitting through the second Nomarski prism 64 is Δ. So the Jones vector of the spectral light is:

$$A = \frac{\sqrt{2}}{2}\begin{bmatrix} 1 \\ e^{-i2\pi\sigma\Delta} \end{bmatrix}$$

The Jones matrix of the third half-wave plate 65 is:

$$G = \frac{\sqrt{2}}{2}\begin{bmatrix} 1 & 1 \\ 1 & -1 \end{bmatrix}$$

The Jones matrices of the second polarizing beam splitter 71 for the transmitted light and the reflected light are:

$$P_1 = \begin{bmatrix} 1 & 0 \\ 0 & 0 \end{bmatrix}$$

$$P_2 = \begin{bmatrix} 0 & 0 \\ 0 & 1 \end{bmatrix}$$

The Jones vectors of the light we acquire on the CCD of transmitted spectral branch 73 and the CCD of reflected spectral branch 75 are:

$$C_1 = P_1 \cdot G \cdot A = \frac{1}{2}\begin{bmatrix} 1 + \cos(2\pi\sigma\Delta) - i\sin(2\pi\sigma\Delta) \\ 0 \end{bmatrix}$$

$$C_2 = P_2 \cdot G \cdot A = \frac{1}{2}\begin{bmatrix} 0 \\ 1 - \cos(2\pi\sigma\Delta) + i\sin(2\pi\sigma\Delta) \end{bmatrix}$$

Assume that the intensity of objective light is $B_o$, so the interference light intensities obtained by the CCD of transmitted spectral branch 73 and the CCD of reflected spectral branch 75 are:

$I_1 = \frac{1}{2}B_o[1+\cos(2\pi\sigma\Delta)]$ $I_2 = \frac{1}{2}b_o[1-\cos(2\pi\sigma\Delta)]$ Take the difference between these two interferogram as the final interferogram:

$I(\Delta) = I_1 - I_2 = B_o \cos(2\pi\sigma\Delta)$

Generalize the objective light to polychromatic light:

$I(\Delta) = \int_{-\infty}^{+\infty} B(\sigma) e^{2\pi\sigma\Delta} d\sigma$

This formula can be transformed to:

$$B(\sigma) = \frac{1}{2\pi}\int_{-\infty}^{+\infty} I(\Delta) e^{-2\pi\sigma\Delta} d\Delta$$

That is to say, the spectral density function $B(\sigma)$ of the objective light is the Fourier Transform of the interference intensity $I(\Delta)$.

The Nomarski prisms used in this invention is made from quartz and the distribution curve of the optical path difference versus the displacement from the zero-OPD is shown in FIG. 3.

As is shown in FIG. 4, two prisms and three half-wave plates are rotated by a small angle $\delta$ about the z axis. Finally, image replication is incorporated using the lenslet array 4 in front of the interferometer. The 2×M×N sub-images are formed coincident with these two CCDs behind the second polarizing beam splitter 71 respectively, where M and N are the number of lenslets along x and y. An example of the OPD versus spatial position, relative to each sub-image obtained by the CCD of transmitted spectral branch 73, is depicted in FIG. 5. Notable is the large slope in OPD along x, produced predominantly by the wedges of the prisms, and the relatively small slope along y, which is realized through the small rotation $\delta$. The angle $\delta$ can be calculated by:

$$\delta = \arctan\left(\frac{1}{N}\right)$$

This rotation enables each sub-image to view sequentially larger values of OPD. To emphasize this, the sub-images in FIG. 5 are numbered 1-16, with images 1 and 16 representing the most negative and positive OPD samples, respectively. Consequently, each sub-image samples a different "slice" of the 3D interferogram cube, as depicted in FIG. 6, which has dimensions $(x_i, y_i, OPD)$; here, $x_i$ and $y_i$ are the spatial coordinates within the sub-images.

In the same way, the sub-images obtained by the CCD of reflected spectral branch 75 can make up a 3D interferogram cube too. We take the difference between these two 3D interferogram cubes as the final cube. Thus, an interferogram and its corresponding spectrum can be calculated at each spatial location within the scene. Performing the required post-processing calculations produces the spectral density function $B(\sigma)$ at each pixel within the objective image.

In this invention, the imaging branch can obtain a high spatial resolution, colorful image, which can be combined with the low spatial resolution, high spectral resolution image obtained by the spectral branch. Thus, we can get the high spatial resolution, high spectral resolution image by an appropriate interpolation.

Example 2

The difference between this example and example 1 is that said lenslet array 4 is replaced by a Fresnel zone plate array. The schematic illustration of a single Fresnel zone plate is depicted in FIG. 7, and FIG. 8 is schematic illustration of a 4×4 Fresnel zone plate array.

What is claimed is:

1. A real-time birefringent imaging spectrometer based on differential structure, which comprises:
    a object lens (1) provided to image the object;
    a field stop (2) provided to limit the field of view;
    a collimator lens (3) provided to collimate the objective light;
    a lenslet array (4) provided to incorporate image replication;
    a first polarizing beam splitter (51) provided to split the objective light into two orthogonally polarized components;
    an imaging branch to receive the light reflected by said the first polarizing beam splitter (51);
    a spectral branch to receive the light transmitted by said the first polarizing beam splitter (51) via the lenslet array (4);
    a second polarizing beam splitter (71) provided to split the light transmitted by said spectral branch into two orthogonally polarized components;
    a transmitted spectral branch to receive one of output lights from said second polarizing beam splitter (71);
    a reflected spectral branch to receive another of output lights from said second polarizing beam splitter (71).

2. The real-time birefringent imaging spectrometer based on differential structure claimed in claim 1, wherein
    an imaging branch comprising: an eye lens (52) provided to focus the light reflected by said the first polarizing beam splitter (51), and
    a CCD of the imaging branch (53) provided to detect the light focused by said eye lens (52);
    a first half-wave plate (61) provided to change the polarization of the light transmitted by said the first polarizing beam splitter (51),
    a first Nomarski prism (62) provided to split the light transmitted by said the first half-wave plate (61) into two orthogonally polarized components with an optical path difference, a second half-wave plate (63) provided to change the polarization of the components split by said the first Nomarski prism (62), a second Nomarski prism (64) provided to compensate the localization plane to be perpendicular to optical axis, and a third half-wave plate (65) provided to change the polarization of the light transmitted by said the second Nomarski prism (64);

a transmitted spectral branch comprising: a eye lens of transmitted spectral branch (72) provided to focus the light transmitted by said the second polarizing beam splitter (71), and a CCD of transmitted spectral branch (73) provided to detect the light focused by said the eye lens of transmitted spectral branch (72); and a reflected spectral branch comprising an eye lens of reflected spectral branch (74) provided to focus the light reflected by said the second polarizing beam splitter (71), and a CCD of reflected spectral branch (75) provided to detect the light focused by said the eye lens of reflected spectral branch (74).

3. A real-time imaging spectral method based on the system claimed in claim 1, which comprise the steps of:
   (a) dividing the objective light into two orthogonally polarized components by a polarizing beam splitter;
   (b) focusing the component reflected by the polarizing beam splitter onto a CCD and acquiring a high spatial resolution, colorful image of object;
   (c) dividing the light transmitted by the polarizing beam splitter into two orthogonally polarized components by another polarizing beam splitter;
   (d) focusing these two components onto two CCDs respectively and acquiring two sets of M×N sub-images of object;
   (e) taking the difference of these two sets of M×N sub-images of object as the final sub-images;
   (f) arranging the sub-images by values of optical path difference sequentially, so each sub-image samples a different "slice" of the 3D interferogram cube;
   (g) performing the required preprocessing calculations;
   (h) taking Fourier Transform of data on the optical path difference dimension at each spatial location, and therefore acquiring a low spatial resolution, high spectral resolution image;
   (i) acquiring a high spatial resolution, high spectral resolution image by combining the high spatial resolution, colorful image with the low spatial resolution, high spectral resolution image by an appropriate interpolation.

4. A real-time imaging spectral method based on the system claimed in claim 2, which comprise the steps of:
   (a) dividing the objective light into two orthogonally polarized components by a polarizing beam splitter;
   (b) focusing the component reflected by the polarizing beam splitter onto a CCD and acquiring a high spatial resolution, colorful image of object;
   (c) dividing the light transmitted by the polarizing beam splitter into two orthogonally polarized components by another polarizing beam splitter;
   (d) focusing these two components onto two CCDs respectively and acquiring two sets of M×N sub-images of object;
   (e) taking the difference of these two sets of M×N sub-images of object as the final sub-images;
   (f) arranging the sub-images by values of optical path difference sequentially, so each sub-image samples a different "slice" of the 3D interferogram cube;
   (g) performing the required preprocessing calculations;
   (h) taking Fourier Transform of data on the optical path difference dimension at each spatial location, and therefore acquiring a low spatial resolution, high spectral resolution image;
   (i) acquiring a high spatial resolution, high spectral resolution image by combining the high spatial resolution, colorful image with the low spatial resolution, high spectral resolution image by an appropriate interpolation.

* * * * *